United States Patent [19]

Oiso et al.

[11] Patent Number: 4,526,525
[45] Date of Patent: Jul. 2, 1985

[54] FLEECY CONFECTIONERY PRODUCING MACHINE

[75] Inventors: Hisayoshi Oiso, Tokyo; Norio Joyama, Yokohama; Kazuhiro Fujimoto, Yachiyo; Kozo Okamoto, Kyoto, all of Japan

[73] Assignee: Meiji Seika Kaisha, Ltd., Tokyo, Japan

[21] Appl. No.: 597,313

[22] Filed: Apr. 6, 1984

[30] Foreign Application Priority Data

Apr. 8, 1983 [JP] Japan .................................. 58-60917
Apr. 8, 1983 [JP] Japan ............................. 58-51600[U]

[51] Int. Cl.³ .................... B29C 17/10; B29F 3/08; A23G 3/18
[52] U.S. Cl. .................... 425/9; 425/174.8 R; 425/296; 425/308; 425/373; 425/378 S
[58] Field of Search ............. 425/9, 174.8 R, 174.8 E, 425/376 R, 382 R, 373, 378 S, 296, 308, 379 S

[56] References Cited

U.S. PATENT DOCUMENTS 3,118,397  1/1964  Brown et al. ........................ 425/9
3,930,043  12/1975  Warning et al. ..................... 425/9

FOREIGN PATENT DOCUMENTS 1175080  3/1959  France ........................ 425/379 S

*Primary Examiner*—Willard E. Hoag
*Attorney, Agent, or Firm*—Armstrong, Nikaido Marmelstein & Kubovcik

[57] ABSTRACT

A fleecy confectionery producing machine for extruding confectionery material into continuous viscous fibers which comprises a confectionery extruding mechanism including a rotary extruding cylindrical member having extruding through holes and a melting chamber and an integral cylindrical portion formed therein, a stationary cylindrical member positioned within said cylindrical portion in coaxial therewith and an exciting coil interposed between said cylindrical portion and stationary cylindrical member; a confectionery receiving chamber for receiving extruded confectionery from said extruding mechanism; a gaseous body suction chamber positioned below said receiving chamber, conveyer means for carrying said extruded confectionery, rolling means for levelling said extruded confectionery and a cutter for cutting said extruded confectionery to a predetermined size.

9 Claims, 5 Drawing Figures

FLEECY CONFECTIONERY PRODUCING MACHINE

BACKGROUND OF THE INVENTION

This invention relates to a fleecy confectionery producing machine which includes a rotary fleecy confectionery extruding cylindrical member rotating at a high speed to extrude the material for the fleecy confectionery into continuous fibers.

Hithertofore, since the rotary fleecy confectionery extruding cylindrical member of the fleecy confectionery producing machine was heated with gas, when the gas was burnt, the gas decomposed into carbon dioxide and water and the water adhered to the produced fleecy confectionery fibers to thereby make it difficult to maintain the confectionery in the fibrous form for a long period of time.

It has been also known the rotary fleecy confectionery extruding cylindrical member having a plurality of circular through holes or slits and a nichrome wire heater attached to the inner peripheral surface of the cylindrical member. However, in order to prevent leak from or short-circuiting of the nichrome wire heater, the part surrounding the nichrome wire heater has to be made insulative having burning resistance by subjecting the part to porcelain enamel treatment. It is difficult to perform perfect porcelain enamel treatment on the surrounding part to make the part insulative and the thus treated part has a noninsulative portion which is quite hazardous. In addition, the thus treated surrounding part has a pin hole or holes formed therein and tends to become hazardous state after a prolonged use of the rotary fleecy confectionery extruding cylindrical member. In addition, porcelain enamel treatment itself is not suitable for mass production scheme. Furthermore, in order to supply current to the nichrome wire heater attached to the inner peripheral surface of the rotary fleecy confectionery extruding cylindrical member, it is necessary to mount a slip ring capable of resisting high voltage and a rotary transducer on the rotary shaft of the rotary cylindrical member resulting in massive structure.

A domestic fleecy confectionery producing device is shown in Japanese Utility Model Application Publication No. 30718/1969 (Japanese Utility Model Application No. 78793/1966 filed Aug. 22, 1966 in the names of Hiroshi Nemoto et al.) and the domestic fleecy confectionery producing device comprises a vertical frame including a plurality of legs the lower ends of which are covered by rubber caps, an open top cylinder mounted on the frame and having openings in the side wall, a material receiving container coaxially supported within the cylinder and having an open top lid surrounding an upper portion of the container, a vertical shaft drivingly connected at the upper end to the material receiving container and having a pinion mounted at the lower end, a gear meshing with the pinion, a horizontal shaft for the gear, an arm connected to the other end of the horizontal shaft, a handle connected to the other end of the arm, an electric heater mount mounted within the cylinder below the container and having a nichrome wire wound on the heater mount and a shroud surrounding a lower portion of the container and the heater mount. However, the known domestic confectionery producing device has the disadvantages that a rather long time is required to heat the rotary fleecy confectionery extruding cylindrical member or material receiving container to an operative temperature and that thermal load on the rotary cylindrical member and accordingly, the heating temperature varies depending upon the feed rate of materials to the container.

In the domestic fleecy confectionery producing device of the above type, if the fleecy confectionery material employed consists of monosaccharide only, fleecy confectionery fibers can be continuously extruded by predeterminating the number and diameter of through holes in the rotary extruding cylindrical member or container. However, also in such a case, although the rotary fleecy confectionery extruding cylindrical member is rotated at a high speed to produce fleecy confectionery fibers, if the rotational speed is excessively high or low, satisfactory fleecy confectionery fibers can not be produced and it is difficult to determine the rotational speed of the cylindrical member in the domestic fleecy confectionery producing device of the above type. And the domestic fleecy confectionery producing device is difficult to be applied for producing fleecy confectionery fibers using disaccharide, mixtures thereof and other mixtures containing chewing gum base as materials.

In Japanese Patent Application Publication No. 21741/1966 (Japanese Patent Application No. 12616/1964 filed Mar. 7, 1964 in the name of Haruo Akutsu) for "Fleecy Confectionery Fiber Gathering Method in Fleecy Confectionery Producing Machine", there is disclosed the method in which a fleecy confectionery fiber receiving chamber is provided surrounding a rotary fleecy confectionery fiber extruding member in peripherally spaced relationship to the latter, an air flow is formed within the chamber for rotation in the same direction as the rotational direction of the rotary extruding member, fleecy confectionery fibers extruded from the extruding member are entrained on the air flow which discharges from the chamber through the discharge opening in the chamber and the confectionery fibers entrained on the air flow are wound about a winding stick such as a chopstick to obtain a final confectionery product. However, the method can not produce fleecy confectionery product as having any desired configuraiton such as sheet, mat, three-dimensions or square configuration.

SUMMARY OF THE INVENTION

Therefore, the present invention is to eliminate the disadvantages inherent in the prior arts referred to hereinabove. One object of the present invention is to eliminate the tendency of fleecy confectionery fibers to absorb water produced through decomposition of combustion gas and leak through and slow rising in temperature in the rotary fleecy confectionery extruding cylindrical member by electroheating. Another object of the present invention is to provide a fleecy confectionery producing machine which eliminates the tendency of fleecy confectionery fibers to absorb water produced through decomposition of combustion gas and leak through and slow rising in temperature in the rotary fleecy confectionery fiber extruding cylindrical member by electroheating and which can easily produce satisfactory fleecy confectionery using disaccharide or mixtures thereof or mixtures containing chewing gum base as the material. A further object of the present invention is to provide a fleecy confectionery producing machine which can form extruded confectionery fibers to desired configurations simulated the consistency of cotton candy or candy floss.

According to one aspect of the present invention, there has been provided a fleecy confectionery producing machine which essentially comprises a rotary extruding mechanism including a rotary confectionery extruding cylindrical member having a plurality of extruding through holes in the periphery, an inner material melting chamber and an integral inner cylindrical portion, a shaft on which said cylindrical member is fixed and which is drivingly connected to a drive motor, a stationary cylindrical member positioned within said integral cylindrical portion and an exciting coil disposed about said stationary cylindrical member in spaced and facing relationship to said integral cylindrical portion; a confectionery receiving chamber for receiving extruded confectionery from said extruding mechanism, said receiving chamber being open at the bottom; a gaseous body suction chamber positioned below said receiving chamber for attracting said extruded confectionery from the receiving chamber, a first conveyer interposed between said confectionery receiving chamber and suction chamber for carrying the confectionery away from said receiving chamber with the confectionery held thereon by the attractive action provided by said suction chamber, a first roller means positioned adjacent to the discharge side of said receiving chamber in the conveying path of said confectionery as the confectionery is carried away from the receiving chamber for levelling the confectionery, a second conveyer positioned downstream of said first conveyer in the conveying path for receiving the confectionery from the first conveyer and including a second roller means for further levelling the confectionery, a discharge conveyer positioned downstream of said second conveyer in the conveying path for receiving the confectionery from the second conveyer and discharging the confectionery out of said machine and a cutter positioned between said second and third conveyers in the conveying path for cutting the confectionery to a predetermined size.

The above and other objects and attendant advantages of the present invention will be more readily apparent to those skilled in the art from a reading of the following detailed description in conjunction with the accompanying drawings which show one preferred embodiment of the same for illustration purpose only, but not for limiting the scope of the invention in any way.

PREFERRED EMBODIMENT OF THE INVENTION

The present invention will be now described referring to the accompanying drawings in which one preferred embodiment of the fleecy confectionery producing machine constructed in accordance with the principle of the present invention is illustrated.

Figure 1:
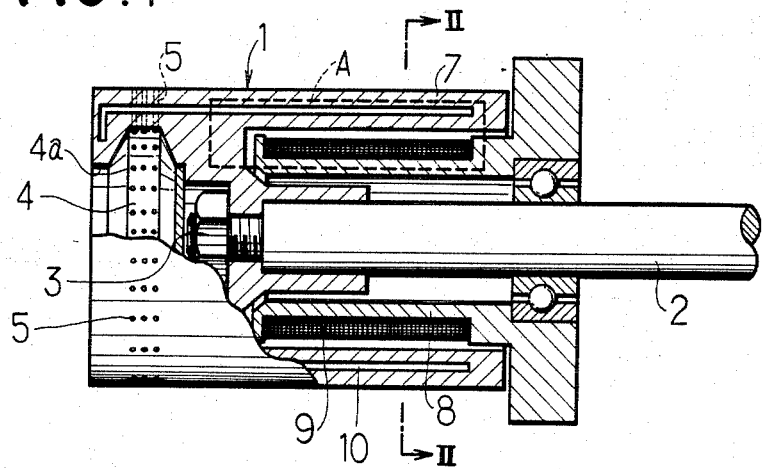
FIG. 1 is a fragmentary side elevational view in partial section of the rotary fleecy confectionery extruding mechanism of the fleecy confectionery producing machine according to the present invention.
Figure 2:
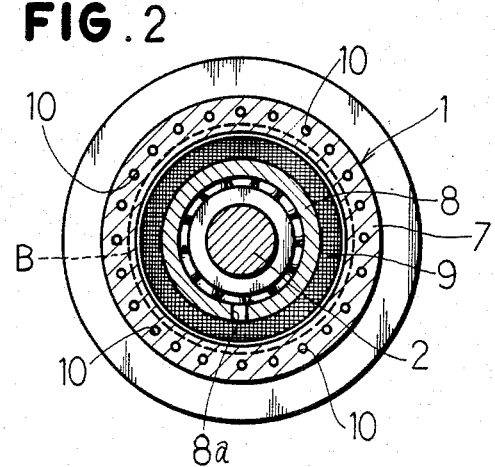
FIG. 2 is a vertically sectional view taken along the line 11—11 of FIG. 1.

First referring to FIGS. 1 and 2, there is shown the rotary fleecy confectionery extruding mechanism to be incorporated in the confectionery producing machine of the invention and the extruding mechanism is adapted to extrude fleecy confectionery comprising a number of viscous fibers.

The rotary fleecy confectionery extruding mechanism generally comprises a substantially hollow rotary fleecy confectionery extruding cylindrical member 1 closed at one end and a horizontal rotary shaft 2 extending in the axial direction of the cylindrical member with one end extending beyond the adjacent open end of the cylindrical member and the threaded other end terminating short of the other or closed end of the cylindrical member and secured thereto by means of a nut 3.

A confectionery material melting chamber 4 is formed within the cylindrical member 1 adjacent to the other end thereof and in communication with an opening 4a formed in the closed end of the cylindrical member 1 and having the diameter smaller than that of the melting chamber 4. A plurality of small through holes 5 are formed in the peripheral wall of the cylindrical member 1 surrounding and communicating with the melting chamber 4 for extruding the molten confectionery material from the melting chamber 4 through the holes 5 out of the mechanism as fleecy confectionery comprising a number of viscous fibers.

A cylindrical portion 7 in the form of a skirt is formed within the cylindrical member 1 integrally and coaxial with and extends from a position adjacent to the open end of the cylindrical member 1 to a position adjacent to the melting chamber 4. The entire cylindrical member 1 including the cylindrical portion 7 is formed of magnetic material such as silicon steel, iron material, carbon steel or rolled steel.

Provided within the cylindrical portion 7 in coaxial relationship thereto is a flanged stationary cylindrical member 8 the flange of which is disposed outside of the rotary cylindrical member 1 and journals the rotary shaft 2 therein. The stationary cylindrical member 8 is also formed of the same magnetic material as that of the rotary cylindrical member 1. An exciting coil 9 is wound about the stationary cylindrical member 8 in a slightly spaced relationship to the inner periphery of the cylindrical portion 7 on the rotary cylindrical member 1.

The exciting coil 9 is electrically connected to an AC power source (not shown) and thus, when the AC power source is turned on, a closed magnetic circuit is provided in the coil 9 in which circuit current flows in the direction shown by the dash line A in FIG. 1 and an alternation magnetic flux is generated in the magnetic circuit. At the same time, short circuit current flows through the cylindrical portion 7 in the direction shown by the dash line B in FIG. 2 due to the electromagnetic induction action of the coil 9. Thus, the rotary cylindrical member 1 is heated by hysteresis loss in the rotary cylindrical member 1 itself as the alternation magnetic flux passes through the closed magnetic circuit and Joule heat generated from the short circuit current.

In FIG. 2, reference numeral 8a denotes a notch formed in the stationary cylindrical member 8 and the provision of the notch 8a in the stationary cylindrical member 8 prevents the flow of the short circuit current through the stationary cylindrical member 8 in the circumferential direction thereof and also inhibits the generation of Joule heat in the member 8 even when current is allowed to flow through the exciting coil 9.

A plurality of jacket chambers 10 are formed in the rotary cylindrical member 1 in a circumferentially spaced relationship about the circumference of the member and each of the jacket chambers 10 contains heat medium therein leaving a space for evaporation of the heat medium. The greater the evaporation calorie of the heat medium is the more effective the temperature distribution improvement throughout the rotary cylindrical member 1 is. As the rotary fleecy confectionery extruding cylindrical member 1 rotates while being heated by the electromagnetic induction action, in the higher temperature portion 7 of the rotary cylindrical member 1, that is, in the cylindrical portion 7 of the rotary cylindrical member 1 facing the exciting coil 9, the heat medium such as water, for example, evaporates to deprive the cylindrical portion 7 of heat whereas the water condensates at the area of the rotary cylindrical member 1 surrounding the confectionery material melting chamber 4 and having the through holes 5 to transfer heat to the said area. Thus, the temperature in the rotary cylindrical member 1 is maintained uniform by the heat conductive action of the magnetic material of the rotary cylindrical member 1 and also the heat exchange through the evaporation and condensation of the heat medium.

Since the rotary fleecy confectionery extruding cylindrical member 1 is heated in the manner mentioned hereinabove, the fleecy confectionery material contained in the melting chamber 4 is melted down and extruded from the melting chamber through the through holes 5 in the form of fleecy confectionery comprising a number of fibers to the exterior of the extruding mechanism as the rotary cylindrical member 1 rotates at a high speed.

Figure 3:
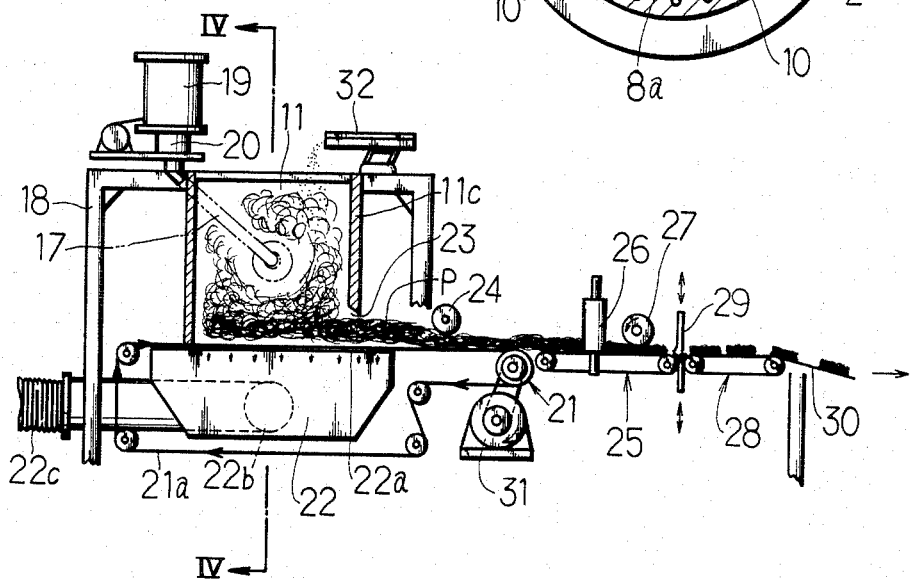
FIG. 3 is a side elevational view in partial section on a reduced scale of the fleecy confectionery producing machine according to the present invention in which the rotary confectionery extruding mechanism of FIG. 1 is incorporated.
Figure 4:
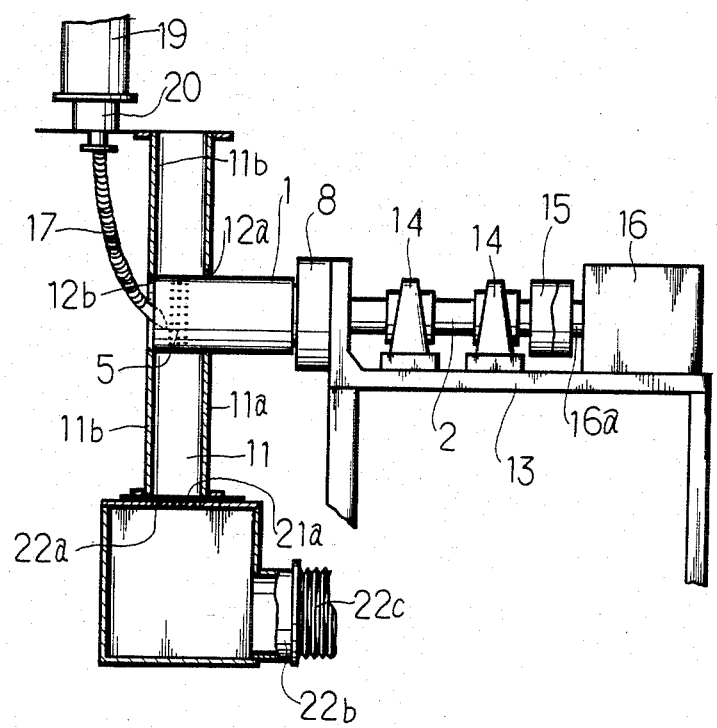
FIG. 4 is a vertically sectional view on an enlarged scale taken along the line IX—IV of FIG. 3.

Referring now to FIGS. 3 and 4 of the accompanying drawings, the preferred embodiment of the fleecy confectionery producing machine according to the the present invention is illustrated. As shown in these Figures, the above-mentioned fleecy confectionery extruding mechanism is incorporated in the machine with the area of the rotary fleecy confectionery extruding member 1 having the through holes 5 and accordingly, the confectionery material melting chamber 4 in the extruding mechanism housed in a vertically extending fleecy confectionery receiving chamber 11 in the machine. That is, as more clearly shown in FIG. 4, the rotary fleecy confectionery extruding cylindrical member 1 is fixedly mounted on the horizontal rotary shaft 2 which is in turn rotatably supported in bearings 14, 14 . . . mounted on a pedestal 13. The rotary shaft 2 is drivingly connected through a coupling 15 to the output shaft 16a of a motor 16. The fleecy confectionery extruding mechanism is so positioned within the fleecy confectionery producing machine that the through hole area 5 of the rotary cylindrical member 1 is positioned between the opposite side walls 11a, 11b of the fleecy confectionery receiving chamber 11 and engaged in the openings 12a, 12b in the chamber side walls 11a, 11b with the opening 4a in the closed end of the rotary cylindrical member 1 lying in the same vertical plane as the opening 12b in the side wall 11b. The leading or lower end of a flexible material throw-in tube 17 extends into the material melting chamber 4 in the rotary cylindrical member 1 and the upper end of the tube 17 is in communication with the lower end of a material storage tank 19 mounted on a framework 18. A feeder 20 is disposed about the upper end of the flexible tube 17 to allow confectionery material to flow down at a predetermined rate through the tube 17 into the melting chamber 4.

The fleecy confectionery receiving chamber 11 is open at the bottom and an endless net type conveyer 21 runs right below the open bottom of the chamber 11 to close the bottom.

The endless net type conveyor 21 is formed of a metal net web 21a produced by weaving flexible metal wires, a flexible porous plastic web, a net produced by applying fluorine resin to a fabric web and then perforating the fabric web or a net produced by applying fluorine resin to threads and then weaving the threads. The openings in the net web may have any size sufficiently small not to allow the fibers of fleecy confectionery which is extruded from the rotary fleecy confectionery extruding cylindrical member to fall down through the openings in the net web.

A gaseous body suction chamber 22 is positioned below the chamber 11 between the upper and lower runs of the endless net type conveyer 21. The suction port 22a in the suction chamber 22 opens to the upper run of the net web 21a of the porous conveyer 21 and sucks gaseous body from the receiving chamber 11 through the net web 21a into the suction chamber 22 whereby the fleecy confectionery fibers extruded from the fleecy confectionery extruding mechanism are caused to stick to the net web 21a.

The gaseous body suction chamber 22 has an exhaust port 22b in one side wall thereof and an exhaust duct hose 22c is connected to the exhaust port 22b. The exhaust duct hose 22c is connected at the other end to an exhaust fan or ejector (not shown).

The leading end wall 11c of the fleecy confectionery receiving chamber 11 in the advancing direction of the endless net type conveyer 21 is formed with a discharge opening 23 through which the fleecy confectionery fibers P are discharged from the receiving chamber 11 by the advancing net web 21a which entrains the fibers thereon.

A presser roll 24 is provided outside of the chamber 11 adjacent to the discharge openings 23 and just above the upper run of the conveyer 21 to press the fleecy confectionery fibers P being deposited in layers onto the conveyer 21 to a predetermined height.

An adjusting conveyer 25 is provided downstream of the conveyer 21 in the conveying path of the fleecy confectionery and a pair of side rollers 26, 26 are provided adjacent to the opposite sides thereof to roll the fleecy confectionery P at the opposite side edges thereof in the horizon and a second presser roller 27 is provided above the conveyer 25 to roll the confectionery P downwardly.

A discharge conveyer 28 is provided downstream of the adjusting conveyer 25 in the conveying path of the fleecy confectionery P and operates at a speed greater than that at which the two conveyers 21, 25 operate. A cutter 29 is provided in the conveying path of the fleecy confectionery between the conveyers 25, 28 and moves vertically. When the cutter 29 moves downwardly to cut the continuous fleecy confectionery P into portions of a predetermined length.

In FIG. 3, reference numerals 30 and 31 denote a chute and a conveyer drive motor, respectively.

Figure 5:
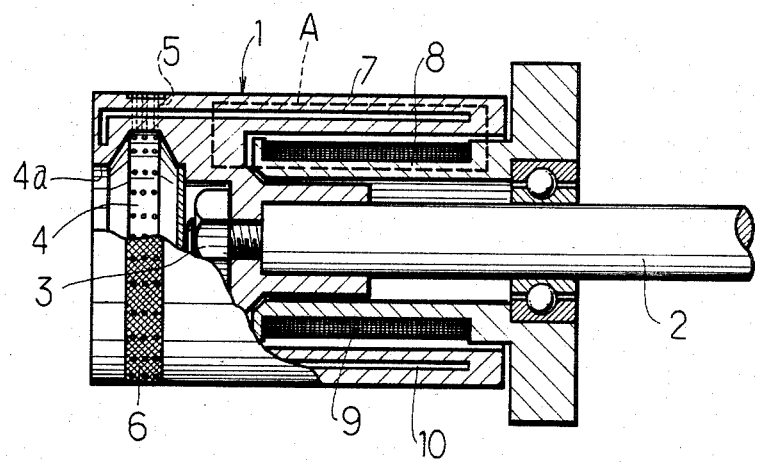
FIG. 5 is a fragmentary side elevational view in partial section of a modification of the rotary fleecy confectionery extruding mechanism as shown in FIG. 1.

FIG. 5 shows a modification of the fleecy confectionery extruding mechanism as shown in FIGS. 1 and 2. The modified fleecy confectionery extruding mechanism of FIG. 5 is substantially similar to that as shown in FIGS. 1 and 2 except that a fine mesh wire-netting means 6 is provided about the rotary cylindrical member 1 to cover the through holes 5. The wire-netting means 6 may have a mesh size determined depending upon the type of the fleecy confectionery material to be employed or comprise a single or plural wire-nettings of the same mesh size whereby the opening of the through holes 5 may be varied as desired.

With the above-mentioned construction and arrangement of the components of the fleecy confectionery producing machine of the invention, in operation, as the material of the fleecy confectionery, one or more of saccharides such as monosaccharide and disaccharide or mixtures of the above-mentioned saccharides and candy or chewing gum base can be selectively employed. The fleecy confectionery materials may be in molten or powdery state. The selected fleecy confectionery material is received in the tank 19 and then thrown into the material melting chamber 4 of the fleecy confectionery extruding mechanism at a metered rate.

Meantime, the motor 16 is maintained in its energized condition to continuously rotate the shaft 2 at a high speed which in turn rotates the rotary fleecy confectionery extruding cylindrical member 1 at the speed and the AC power source is energized to supply current to the exciting coil 9 to heat the cylindrical member 1.

Current to be supplied to the exciting coil 9 is adjusted by an autotransformer, thyristor or saturable reactor to control the temperature of the rotary fleecy confectionery extruding cylindrical member 1.

When the fleecy confectionery material contains chewing gum base, the rotary cylindrical member 1 is heated to a temperature on the order of 150° C. by induction heating to melt the material in the melting chamber 4 and when the fleecy confectionery material comprises one or more of saccharides such as sugar, glucose, maltose and lactose, the rotary cylindrical member 1 is heated to a temperature within the range 180°–200° C. to melt the material.

The fleecy confectionery material received in the rotating cylindrical member 1 and more particularly, the melting chamber 4 in the member is subjected to centrifugal force while being induction-heated and the molten confectionery material is then continuously extruded as continuous fibers from the melting chamber 4 through the through holes 5 in the rotating cylindrical member 1 into the confectioney receiving chamber 11.

The above-mentioned fine mesh wire netting means 6 covering the through or extruding holes 5 in the rotary cylindrical member 1 may comprises two wire-nettings or punched sheets having about 100 mesh size (J.I.S., U.S.T.N., B.S.) for extruding continuous fibrous fleecy confectionery P using the confectionery material which consists of saccharide only. On the other hand, when the confectionery material contains chewing gum base, the wire-netting means 6 may comprises a single wire-netting having a mesh size within the range about 50–100 mesh.

Having been received into the fleecy confectionery receiving chamber 11 in the manner mentioned hereinabove, the confectionery fibers are caused to adhere to the net web 21a of the moving conveyer 21 by the attraction force from the suction chamber 22 underlying the conveyer 21 and carried in layers on the net web 21a away from the chamber 11.

The gaseous body sucked into the suction chamber 22 is conducted into the confectionery receiving chamber 11 at the open top thereof. If the open top of the chamber 11 is partially covered, the gaseous body forms a turbulent flow within the chamber 11 resulting in the formation of uneven layers of confectionery fibers on the net web 21a of the conveyer 21. The gaseous body is usually air and preferably has a specific humidity below 50%. If the specific humidity of the gaseous body exceeds 50%, the confectionery fibers P tend to adhere to each other and when deposited in layers on the net web 21a of the conveyer 21, the specific gravity of the fibers becomes excessively high and the fibers are not pleasant to eat.

By suitably adjusting the amount of gaseous body to be sucked in the gaseous body suction chamber 22 and the running velocity of the net web 21a of the conveyor 21 per unit time, the specific gravity and height of the confectionery fibers to be deposited on the net web 21a can be adjusted.

The width of the confectionery fibers P to be extruded through the through holes 5 in the rotary cylindrical member 1 is increased or decreased by increasing or decreasing the dimension of the through holes 5 in the axial direction of the rotary cylindrical member 1.

Furthermore, as the extruded confectionery fibers P are layered onto the net web 21a of the moving conveyer 21, when an additive or additives such as edible coloring matter, spicery and/or organic acid are continuously sprayed over the extruded confectionery fibers P by an automatic additive metering means 32 mountd on the frame 18, the confectionery fibers are selectively imparted color, fragrancy and/or acidity thereto. Alternatively, the additive or additives may be dissolved or suspended in a suitable solvent and the solution may be then sprayed over the extruded confectionery fibers while being layered onto the conveyer net web 21a.

The continuous confectionery fibers P deposited in layers on the conveyer net web 21a are discharged out of the receiving chamber 11 at the discharge opening 23 and carried on the net web 21a of the conveyor 21 away from the chamber 11. As the confectionery fibers P are carried on the conveyer 21, the presser roller 24 which rotates in contact with the fibers P lightly rolls the fibers to level the height of the confectionery fibers P. The dimensions of the discharge opening 23 are preferably just sufficient to allow the extruded confectionery fibers P on the conveyer 21 to pass through the opening 23. If the dimensions of the discharge opening 23 are excessively large, the amount of gaseous body to be sucked through the discharge opening 23 becomes excessively great and the amount of gaseous body to be guided into the chamber 11 at the open top thereof decreases correspondingly resulting in uneven deposition of the confectionery fibers P on the net web 21a of the conveyer 21.

After having been rolled lightly by the presser roller 24, as the confectionery fibers P are conveyed on the conveyer net web 21a, the fibers are transferred onto the moving adjusting conveyer 25 and rolled slightly by the side rollers 26, 26 on the opposite sides of the conveyer 25. The side rollers 26, 26 may be eliminated when the height of the confectionery fibers P deposited on the conveyer net web 21b is low.

After having passed by the side rollers 26, 26, the confectionery fibers P are again rolled slightly to be further levelled by the second presser roller 27 positioned above the conveyer 25.

If the confectionery fibers P are rolled by the presser roller 24 only to a desired levelled final height, the confectionery fibers P may break and/or have an uneven specific gravity.

The thus rolled and adjusted confectionery fibers P are cut to a desired length by a cutter 29 positioned between the two conveyers 25, 28 as the fibers are transferred from the conveyer 25 onto the conveyer 28.

The illustrated cutter 29 is a so-called guillotine cutter, but may be a rotary cutter if desired.

Although not shown, the cut confectionery fibers P are packed in packages formed of low moisture permeability such as aluminum foil coated with plastic, for example and heat-sealed by heat-melting the plastic.

Since the fleecy confectionery producing machine has the above-mentioned construction and the rotary fleecy confectionery extruding cylindrical member is formed of magnetic material, the rotary cylindrical member has a low electric resistance as inductive load at normal temperature or under low temperature conditions and when the exciting coil is supplied with current from the AC power source to raise the temperature of the rotary cylindrical member, at an initial stage of the rise in temperature, short circuit current corresponding to the rise in temperature is induced and the caloric value becomes high transiently and the short circuit current attenuates gradually to a rated current as the temperature rises in relation to the resistance coefficient of the magnetic material of the rotary confectionery extruding cylindrical member.

Therefore, the rotary cylindrical member is heated to a predetermined temperature in a shorter time space and the time space required to heat the rotary cylindrical member of the invention to the confectionery material melting temperature is shortened by $\frac{3}{4}$ to $\frac{2}{3}$ that required to heat a conventional rotary cylindrical fleecy confectionery extruding member having the same capacity and a nichrome wire heater attached thereto to the same temperature.

As mentioned hereinabove, since the rotary fleecy confectionery extruding cylindrical member is induction-heated by electromagnetic induction effect, the cylindrical member serves a direct heat generation source and thus, the rotary confectionery extruding cylindrical member is not required to be formed of high heat conductive materials such as copper and aluminum, but may be formed of any suitable material provided that the material is magnetic.

Furthermore, since the rotary fleecy confectionery extruding cylindrical member has not any separate heat generation source such as a nichrome wire heater, the cylindrical member is not required to have additional means such as a slip ring and a rotary transducer and attains a high safety feature free of troubles such as leak, disconnection and burn-out.

Still furthermore, when thermal load applied to the rotary fleecy confectionery extruding cylindrical member varies as the feed rate of confectionery material to the cylindrical member fluctuates, since the rotary cylindrical member serves as a direct heat generation source by induction-heating and has a temperature sensor incorporated therein to control the temperature of the cylindrical member, the cylindrical member is maintained at a constant temperature. Therefore, even if the feed rate of material to the rotary fleecy confectionery extruding cylindrical member fluctuates, the temperature of the cylindrical member itself will not change substantially whereby confectionery fibers having uniform thickness and mess can be produced.

And the fleecy confectionery fibers extruded from the rotary confectionery extruding cylindrical member will not scatter out of the fleecy confectionery receiving chamber 11 and can be produced without loss of the product. Since the fleecy confectionery receiving chamber 11 is a vertical type, the chamber occupies a relatively small floor space and thus, a plurality of fleecy confectionery producing machines can be installed in series to produce different color fleecy confectionery fibers.

Furthermore, by replaceably providing one or more wire-nettings having different opening sizes about the rotary fleecy confectionery extruding cylindrical member covering the through holes 5 to vary the diameter and/or number of the through holes, different fleecy confectionery materials including one or more of monosaccharide and disaccharide or mixtures of these saccharides and candy or chewing gum base can be employed to produce different fleecy confectionery fibers.

In addition, as mentioned hereinabove, since the rotary fleecy confectionery extruding cylindrical member is induction-heated, energy efficiency is quite high which is over about four times as high as that of gas heating and about one and a half times as high as that of nichrome wire heating and thus, the cylindrical member is economical. Particularly, the produced fleecy confectionery will not be wetted with water which generates as the result of decomposition of gas when heated with gas and the produced fleecy confectionery can be quite easily cut.

While one specific embodiment of the invention has been shown and described in detail, it will be understood that the same is for illustration purpose only and not to be taken as a definition of the invention, reference being had for this purpose to the appended claims.

What is claimed:

1. In a fleecy confectionery producing machine comprising a rotary confectionery extruding cylindrical member adapted to hold confectionery material thrown therein and having a plurality of through holes in the periphery of said cylindrical member for extruding molten confectionery therethrough and a material melting chamber formed in the interior of said cylindrical member in communication with said through openings and heating means for heating said melting chamber, characterized by that said confectionery extruding cylindrical member is formed of magnetic material, a cylindrical portion is integrally formed with said cylindrical member at one end thereof in coaxial relationship to the cylindrical member, said cylindrical portion being formed on the inner periphery of the cylindrical member, a stationary cylindrical member is provided within said cylindrical portion in coaxial relationship to the cylindrical portion and an exciting coil is supported on said stationary cylindrical member facing the inner peripheral surface of said cylindrical portion whereby when said exciting coil is energized by supplying current from an AC power source to the coil, said rotary confectionery extruding cylindrical member is heated.

2. In a fleecy confectionery producing machine comprising a rotary confectionery extruding cylindrical member adapted to hold confectionery material thrown therein and having a plurality of through holes in the periphery of said cylindrical member for extruding molten confectionery therethrough and a material melting chamber formed in the interior of said cylindrical member in communication with said through openings and heating means for heating said melting chamber, characterized by that said confectionery extruding cylindrical member is formed of magnetic material, a cylindrical portion is integrally formed with said cylindrical member at one end thereof in coaxial relationship to the cylindrical member, said cylindrical portion being formed on the inner periphery of the cylindrical member, a stationary cylindrical member is provided within said cylindrical portion in coaxial relationship to the cylindrical portion, an exciting coil is supported on said stationary cylindrical member facing the inner peripheral surface of said cylindrical portion and a replaceable wire-netting means is provided on the periphery of said rotary confectionery extruding cylindrical member covering said through holes, whereby when said exciting coil is energized by supplying current from an AC power source to the coil, said rotary confectionery extruding cylindrical member is heated.

3. In a fleecy confectionery producing machine comprising a rotary confectionery extruding cylindrical member adapted to hold confectionery material thrown therein and having a plurality of through holes in the periphery of said cylindrical member for extruding molten confectionery therethrough, said cylindrical member being formed of magnetic material, a material melting chamber formed in the interior of said cylindrical member in communication with said through holes, a cylindrical portion integrally formed with said cylindrical member at one thereof in coaxial relationship to the cylindrical member, said cylindrical portion being formed on the inner periphery of the cylindrical member, a stationary cylindrical member provided within said cylindrical portion in coaxial relationship to the cylindrical portion and an exciting coil supported on said stationary cylindrical member facing the inner peripheral surface of said cylindrical portion whereby when said exciting coil is energized by supplying current from an AC power source to the coil, said rotary confectionery extruding cylindrical member is heated, characterized by a confectionery receiving chamber in which at least the through hole area of said confectionery extruding cylindrical member is disposed, said confectionery receiving chamber being open at the bottom, a gaseous body suction chamber provided below said confectionery receiving chamber, an endless net web conveyer interposed between said confectionery receiving chamber and said gaseous body suction chamber to carry said extruded confectionery away from said receiving chamber, a first roller meas positioned adjacent to the discharge side of said confectionery receiving chamber in the conveying path of said confectionery as the confectionery is carried away the receiving chamber for levelling said confectionery, a second conveyor positioned downstream of said first conveyer in the conveying path of the confectionery for receiving said confectionery from said first conveyer and including second roller means for further levelling said confectionery, a discharge conveyer positioned downstream of said second conveyer in said conveying path for receiving said confectionery from the second conveyer and discharging the confectionery out of said machine and a cutter positioned in said conveying path between said second and discharge conveyers whereby said confectionery extruded from said extruding cylinder member is received in said confectionery receiving chamber, caused to adhere to said first conveyer under the attraction action of said gaseous body suction chamber and levelled and cut as the confectionery is continuously carried on said successive conveyers.

4. The fleecy confectionery producing machine as set forth in any one of claims 1 to 3, in which said confectionery is one or more of saccharides or mixtures containing candy or chewing gum base.

5. The fleecy confectionery producing machine as set forth in claim 2, in which said wire-netting means comprises one or more wire-nettings having a mesh size within the range of about 50-100 mesh.

6. The fleecy confectionery producing machines as set forth in claim 3, in which said gaseous body is air.

7. The fleecy confectionery producing machine as set forth in any one of claims 1 to 3, in which said rotary confectionery extruding cylindrical member is rotated by a shaft on which said cylindrical member is fixed and which is drivingly connected to a drive motor.

8. A fleecy confectionery producing machine for extruding molten confectionery material into continuous fibers, comprising a rotary extruding mechanism including a rotary confectionery extruding cylindrical member having a plurality of extruding through holes in the periphery, an inner material melting chamber and an integral inner cylindrical portion, a shaft on which said cylindrical member is fixed and which is drivingly connected to a drive motor, a stationary cylindrical member positioned within said integral cylindrical portion and an exciting coil disposed about said stationary cylindrical member in spaced and facing relationship to said integral cylindrical portion; a confectionery receiving chamber for receiving extruded confectionery from said extruding mechanism, said receiving chamber being open at the bottom; a gaseous body suction chamber positioned below said receiving chamber for attracting said extruded confectionery from the receiving chamber, a first conveyer interposed between said confectionery receiving chamber and suction chamber for carrying the confectionery away from said receiving chamber with the confectionery held thereon by the attractive action provided by said suction chamber, a first roller means positioned adjacent to the discharge side of said receiving chamber in the conveying path of said confectionery as the confectionery is carried away from the receiving chamber for levelling the confectionery, a second conveyer positioned downstream of said first conveyer in the conveying path for receiving the confectionery from the first conveyer and including second roller means for further levelling the confectionery, a discharge conveyer positioned downstream to said second conveyer in the conveying path for receiving the confectionery from the second conveyer and discharging the confectionery out of said machine and a cutter positioned between said second and third conveyers in the conveying path for cutting the confectionery to a predetermined size.

9. The fleecy confectionery producing machines as set forth in claim 8, in which said rotary extruding cylindrical member further includes a plurality of jacket chambers disposed in circumferentially spaced relationship therein each containing heat medium leaving space for evaporation of the heat medium.

* * * * *